United States Patent
Tsunoda

(10) Patent No.: US 12,535,641 B2
(45) Date of Patent: Jan. 27, 2026

(54) OPTICAL CONNECTOR AND OPTICAL CONNECTOR MODULE

(71) Applicant: KYOCERA CORPORATION, Kyoto (JP)

(72) Inventor: Masatoshi Tsunoda, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 314 days.

(21) Appl. No.: 18/017,638

(22) PCT Filed: Jul. 19, 2021

(86) PCT No.: PCT/JP2021/027051
§ 371 (c)(1),
(2) Date: Jan. 23, 2023

(87) PCT Pub. No.: WO2022/024855
PCT Pub. Date: Feb. 3, 2022

(65) Prior Publication Data
US 2024/0036269 A1 Feb. 1, 2024

(30) Foreign Application Priority Data
Jul. 29, 2020 (JP) .................. 2020-128660

(51) Int. Cl.
*G02B 6/32* (2006.01)
*G02B 6/38* (2006.01)

(52) U.S. Cl.
CPC ......... *G02B 6/3853* (2013.01); *G02B 6/3885* (2013.01); *G02B 6/327* (2013.01)

(58) Field of Classification Search
CPC ..... G02B 6/327; G02B 6/3853; G02B 6/3885
See application file for complete search history.

(56) References Cited

U.S. PATENT DOCUMENTS 5,420,722 A * 5/1995 Bielak .................. G02B 6/4204
359/708
7,099,534 B2 8/2006 Kato
(Continued)

FOREIGN PATENT DOCUMENTS

| CN | 110741295 A | 1/2020 |
| JP | 2003004960 A | 1/2003 |

(Continued)

OTHER PUBLICATIONS

Translation of WO-2018229992-A1 (Kazumi et al.). (Year: 2018).*

*Primary Examiner* — Ryan A Lepisto
(74) *Attorney, Agent, or Firm* — Duane Morris LLP

(57) ABSTRACT

According to the present disclosure, an optical connector (20) is attached to an optical transmission line (10) including a base body (11) and an optical waveguide (12) stacked on the base body (11). The optical connector (20) has a first side surface (A1) facing an end of the optical transmission line (10) and a second side surface (A2) located on a side opposite to the side on which the first side surface (A1) is located in a light propagation direction and includes at least one first lens (225) formed in the first side surface (A1) so as to face an end surface of the optical waveguide (12) and multiple second lenses (226) formed at positions on the second side surface (A2), the positions facing the first lens (225) in the light propagation direction. The first lens (225) is smaller in number than the second lenses (226).

19 Claims, 10 Drawing Sheets

(56) References Cited

U.S. PATENT DOCUMENTS

| | | | |
|---|---|---|---|
| 9,568,679 B2* | 2/2017 | Doany | G02B 6/32 |
| 10,139,566 B2* | 11/2018 | Kase | G02B 6/3885 |
| 10,191,216 B2* | 1/2019 | Evans | G02B 6/32 |
| 10,209,452 B1* | 2/2019 | Hung | G02B 6/30 |
| 10,228,520 B2* | 3/2019 | Evans | G02B 6/4292 |
| 10,379,293 B2* | 8/2019 | Nakazuru | G02B 6/32 |
| 10,495,827 B2* | 12/2019 | Tsunoda | G02B 6/3897 |
| 11,143,820 B2* | 10/2021 | Tsunoda | G02B 6/32 |
| 11,474,300 B2* | 10/2022 | Morita | H01S 5/0239 |
| 11,960,128 B2* | 4/2024 | Goldis | G02B 19/0057 |
| 12,019,276 B2* | 6/2024 | Tsunoda | G02B 6/30 |
| 12,032,213 B1* | 7/2024 | Saito | G02B 6/4292 |
| 2010/0215312 A1* | 8/2010 | Daikuhara | G02B 6/4204 |
| | | | 385/36 |
| 2013/0287339 A1 | 10/2013 | Song | |
| 2017/0059781 A1* | 3/2017 | Fortusini | G02B 6/30 |
| 2019/0049672 A1 | 2/2019 | Yoshida | |
| 2020/0103596 A1 | 4/2020 | Tsunoda | |

FOREIGN PATENT DOCUMENTS

| | | | | |
|---|---|---|---|---|
| JP | 6401888 B1 | 10/2018 | | |
| WO | WO-2018229992 A1 * | 12/2018 | | G02B 6/30 |

* cited by examiner

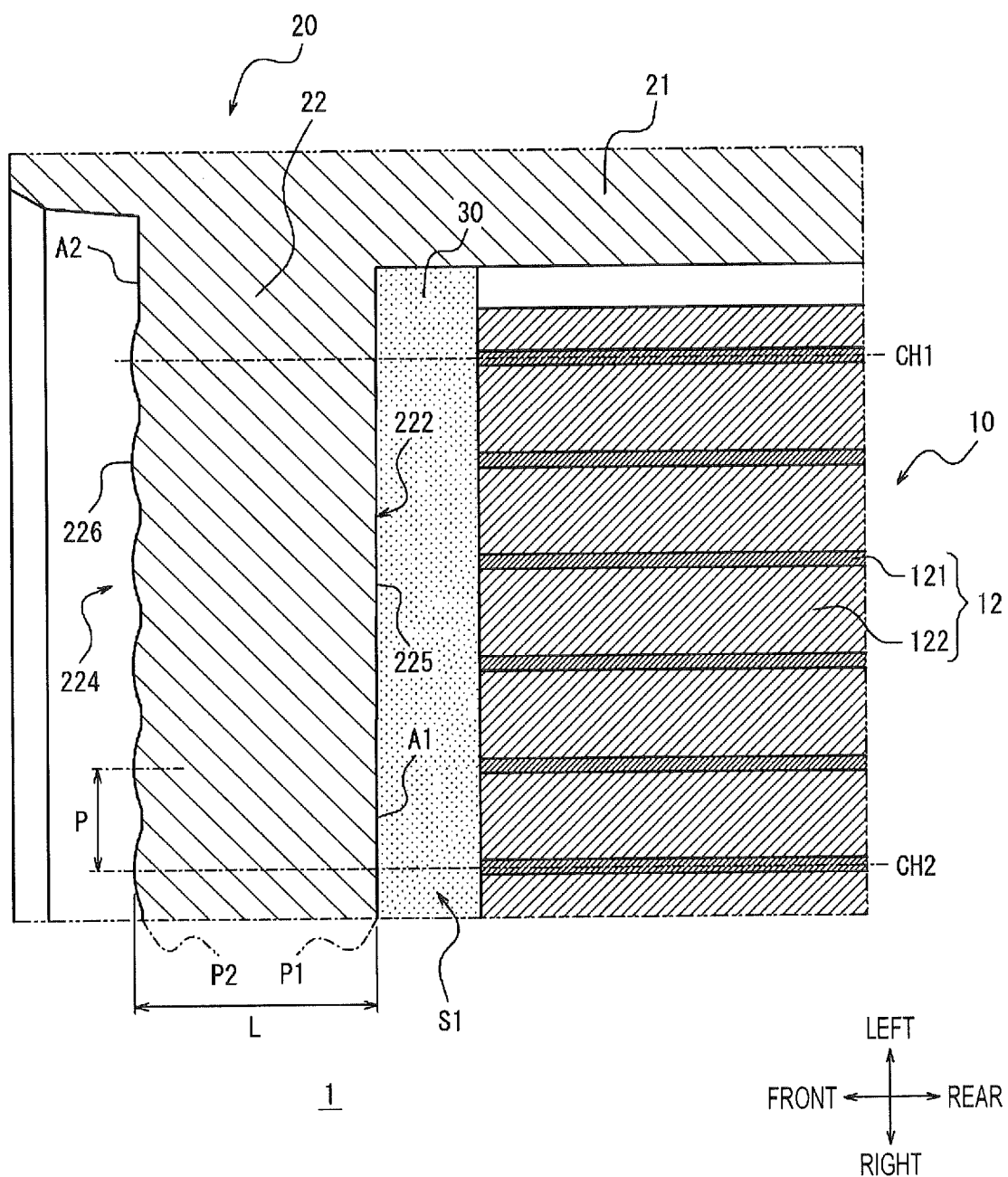

OPTICAL CONNECTOR AND OPTICAL CONNECTOR MODULE

CROSS-REFERENCE TO RELATED APPLICATIONS

The present application claims the priority of Japanese Patent Application No. 2020-128660 filed on Jul. 29, 2020, the disclosure of which is hereby incorporated by reference in its entirety.

TECHNICAL FIELD

The present disclosure relates to an optical connector and an optical connector module.

BACKGROUND OF INVENTION

A known optical connector optically couples optical transmission lines. For example, Patent Literature 1 discloses an optical connector capable of being reduced in size while reducing a coupling loss.

CITATION LIST

Patent Literature

Patent Literature 1: Japanese Patent No. 6401888

SUMMARY

In an aspect of the present disclosure, an optical connector is an optical connector attached to an optical transmission line including a base body and an optical waveguide stacked on the base body. The optical connector includes a first side surface facing an end surface of the optical transmission line, a second side surface located on a side opposite to another side on which the first side surface is located in a light propagation direction, at least one first lens formed in the first side surface in such a manner as to face an end surface of the optical waveguide, and multiple second lenses formed at positions on the second side surface, the positions facing the first lens in the light propagation direction. The first lens is smaller in number than the second lenses.

In another aspect of the present disclosure, an optical connector module includes the above-described optical connector and a refractive-index matching agent interposed between the end surface of the optical transmission line and the first side surface in such a manner as to adjust a refractive index.

BRIEF DESCRIPTION OF THE DRAWINGS

FIG. 8 is an enlarged cross-sectional view taken along line VIII-VIII of FIG. 1.

DESCRIPTION OF EMBODIMENTS

Figure 1:
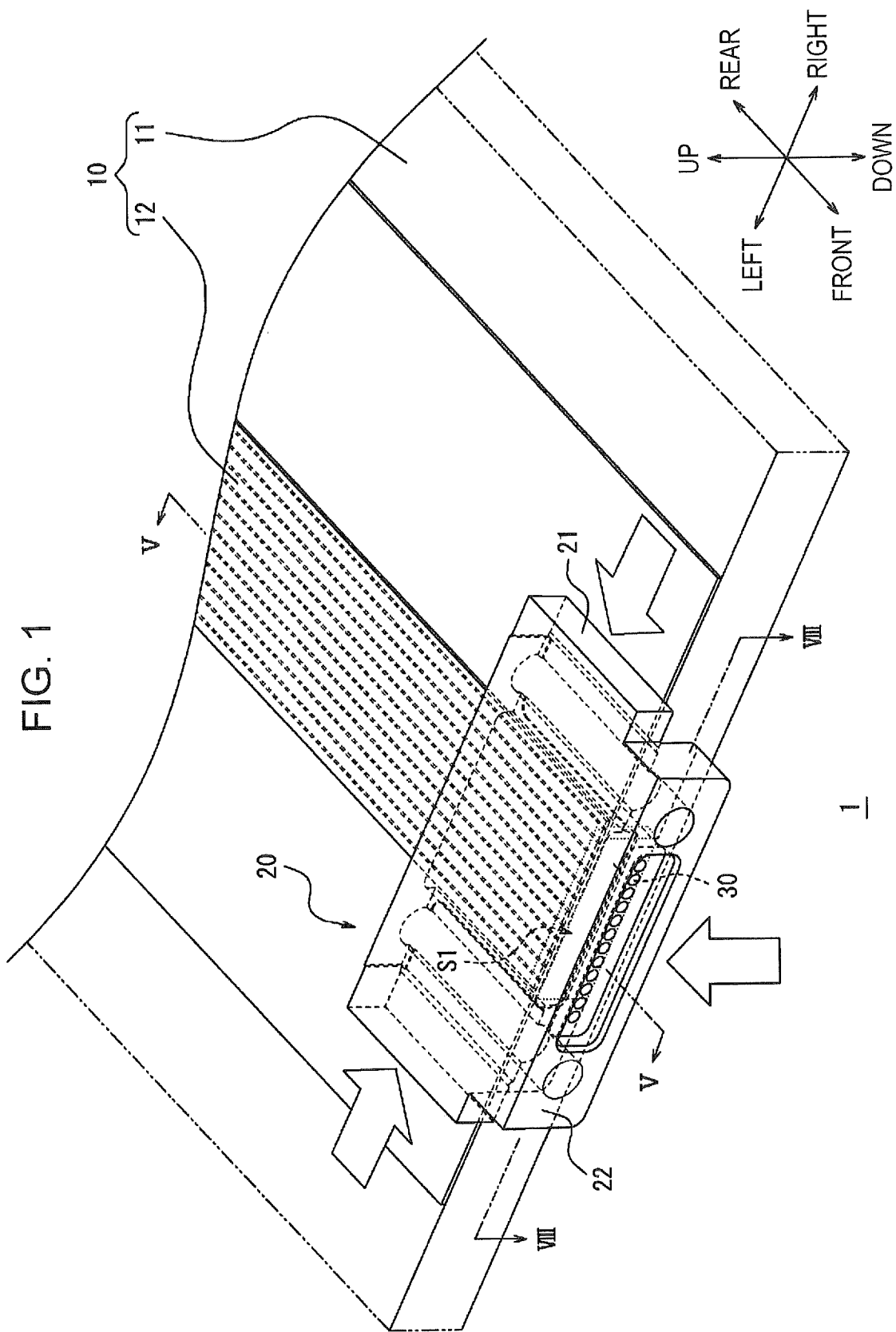
FIG. 1 is an external perspective view of an optical connector module including an optical connector according to an embodiment when viewed from a top surface of the optical connector module.

In the optical connector described in Patent Literature 1, the number of first lenses forming a first lens unit and the number of second lenses forming a second lens unit are each the same as the number of cores included in an optical transmission line. When the first lenses correspond in one-to-one to the second lenses in this manner, the performance of the optical connector is influenced by a property of a material of the optical connector. For example, in the case where the optical connector includes multiple lenses each made of a resin material, warpage, contraction, and the like that occur in a member during manufacturing make it difficult to perform formation of each of the lenses and alignment of the optical axes of first and second lenses with high accuracy. As a result, the optical axis of the first lens and the optical axis of the second lens become misaligned, and this makes it difficult to obtain a desired highly-accurate optical property.

According to an embodiment of the present disclosure, an optical connector and an optical connector module can easily obtain a desired highly-accurate optical property even in the case where a first lens and a second lens are included therein.

An embodiment of the present disclosure will be described in detail below with reference to the accompanying drawings. In the following description, a longitudinal direction, a transverse direction, and the vertical direction correspond to the directions indicated by arrows in the drawings. FIG. 1 to FIG. 10B use the same directions of arrows.

In the present specification, a "light propagation direction" includes, for example, the longitudinal direction. A "first direction perpendicular to the light propagation direction" includes, for example, the transverse direction. A "second direction perpendicular to the light propagation direction and to the first direction" includes, for example, the vertical direction. The present specification is not limited to this case, and the first direction perpendicular to the light propagation direction may include the vertical direction, and the second direction, which is perpendicular to the light propagation direction and to the first direction, may include the transverse direction.

FIG. 1 is an external perspective view of an optical connector module 1 including an optical connector 20 according to an embodiment when viewed from a top surface of the optical connector module 1. A configuration and a function of the optical connector module 1 will now be schematically described with reference to FIG. 1.

The optical connector module 1 includes an optical transmission line 10, the optical connector 20 optically coupled to the optical transmission line 10, and a refractive-index matching agent 30 that adjusts the refractive index of a first space S1 formed between the optical transmission line 10 and the optical connector 20.

The optical connector 20 is attached to the optical transmission line 10 by a mounting method including multiple steps. The mounting method includes, for example, a first step of positioning the optical connector 20 in a state where the optical connector 20 is placed on the optical transmission line 10.

The mounting method includes, for example, a second step of applying an agent between the optical connector 20 and the optical transmission line 10 from the left and right sides of the optical connector 20, which has been positioned in the first step, as indicated by arrows extending along the transverse direction in FIG. 1. The second step is a step of fixing the optical connector 20 to the optical transmission line 10 by using such an agent. In the present specification, the term "agent" includes, for example, any filler that has an adhesive function. For example, the agent includes an adhesive.

The mounting method includes, for example, a third step of injecting the refractive-index matching agent 30 into the first space S1 formed between the optical transmission line 10 and the optical connector 20 from below the optical connector 20, which has been fixed to the optical transmission line 10 in the second step, as indicated by an arrow extending in the upward direction in FIG. 1. The refractive-index matching agent 30 has an adhesive function for fixing the optical connector 20 to the optical transmission line 10 and a function of adjusting the refractive index in the first space S1. The third step is a step of fixing the optical connector 20 to the optical transmission line 10 by using the refractive-index matching agent 30.

The optical connector module 1 is optically coupled to other optical transmission lines such as, for example, an optical fiber and an optical waveguide. For example, the optical connector 20 attached to the optical transmission line 10 in the optical connector module 1 is connected to a ferrule holding an optical fiber, so that the optical transmission line 10 and the optical fiber can be optically coupled to each other. For example, the optical connector 20 attached to the optical transmission line 10 in the optical connector module 1 is connected to another optical connector attached to an optical waveguide like the optical connector 20, so that the optical transmission line 10 and the optical waveguide can be optically coupled to each other.

Figure 2:
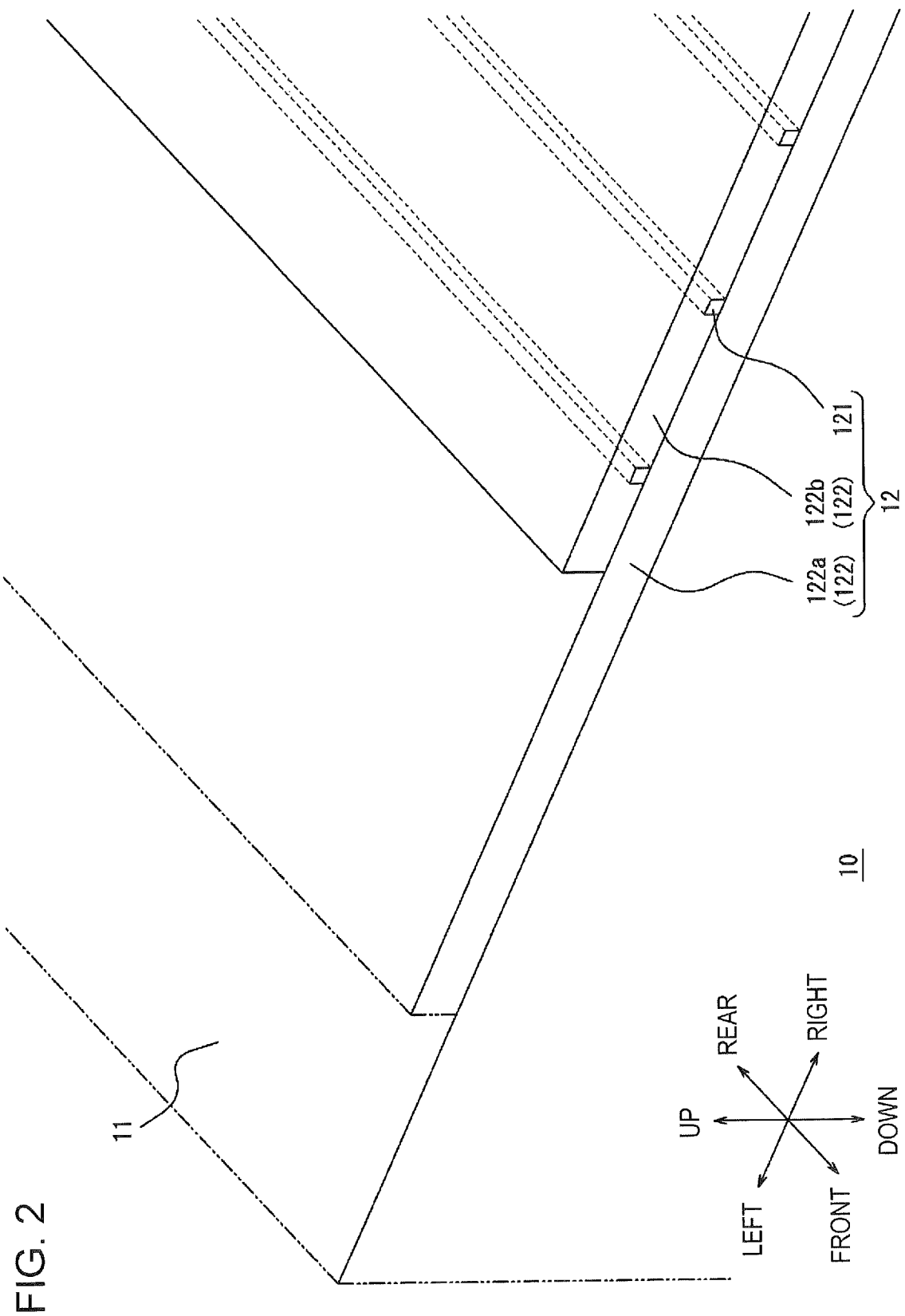
FIG. 2 is an external perspective view in which an optical transmission line illustrated in FIG. 1 is solely illustrated in an enlarged manner as viewed from the top surface.

FIG. 2 is an external perspective view in which the optical transmission line 10 illustrated in FIG. 1 is solely illustrated in an enlarged manner as viewed from the top surface. The configuration of the optical transmission line 10 will now be mainly described with reference to FIG. 2. In the embodiment, the optical transmission line 10 includes a base body 11 and an optical waveguide 12 stacked on the base body 11.

For example, the optical transmission line 10 includes the base body 11 made of a rigid printed wiring board and the optical waveguide 12 stacked on the top surface of the base body 11. The optical waveguide 12 is formed so as to have, for example, a protruding shape protruding upward from the top surface of the base body 11. The optical waveguide 12 is formed so as to have, for example, an end surface that is flush with an end surface of the base body 11 in order to be optically coupled to the optical connector 20. An end surface of the optical waveguide 12 is, for example, a flat surface extending along the end surface of the base body 11. The waveguide mode of the optical waveguide 12 may be either a single mode or a multi-mode.

The optical waveguide 12 includes multiple cores 121 each of which is stacked on the base body 11 in a stacking direction perpendicular to the base body 11 and a cladding 122 stacked on the base body 11 in the stacking direction. More specifically, the optical waveguide 12 includes a first cladding 122a stacked on the top surface of the base body 11, the cores 121 each of which is stacked on the first cladding 122a, and a second cladding 122b surrounding the cores 121 by sandwiching the cores 121 together with the first cladding 122a in the stacking direction.

The multiple cores 121 are formed in such a manner as to be spaced apart from one another at a predetermined pitch in the transverse direction. Each of the cores 121 extends in the longitudinal direction. The cores 121 and the cladding 122 are each made of a suitable material such as, for example, quartz-based glass. The refractive index of each of the cores 121 is higher than the refractive index of the cladding 122. Although the optical waveguide 12 will hereinafter be described as, for example, an embedded optical waveguide, the optical waveguide 12 is not limited to an embedded optical waveguide. The optical waveguide 12 may be any suitable type of optical waveguide, examples of which are a slab optical waveguide, a semi-embedded optical waveguide, and the like.

When the waveguide mode of the optical waveguide 12 is a single mode, the core size of each of the cores 121 is within a range of, for example, 5 μm or larger and 15 μm or smaller. When the waveguide mode of the optical waveguide 12 is a multi-mode, the core size of each of the cores 121 is, for example, 35 μm or larger and 62.5 μm or smaller. In the present specification, the term "core size" includes, for example, the actual size of each of the cores 121 rather than the mode field diameter. The refractive index of each of the cores 121 is, for example, 1.6.

The optical transmission line 10 is manufactured by using, for example, photolithography. A step of manufacturing the first cladding 122a, a step of manufacturing the cores 121, and a step of manufacturing the second cladding 122b are performed in this order. A method of manufacturing the optical transmission line 10 includes a step of stacking the first cladding 122a, which is included in the optical waveguide 12, onto the base body 11 in the stacking direction, which is perpendicular to the base body 11. The method of manufacturing the optical transmission line 10 further includes a step of stacking each of the cores 121, which are included in the optical waveguide 12, onto the first cladding 122a. The method of manufacturing the optical transmission line 10 further includes a step of stacking the second cladding 122b, which is included in the optical waveguide 12, in such a manner that the cores 121 are sandwiched between the second cladding 122b and the first cladding 122a in the stacking direction.

Figure 3:
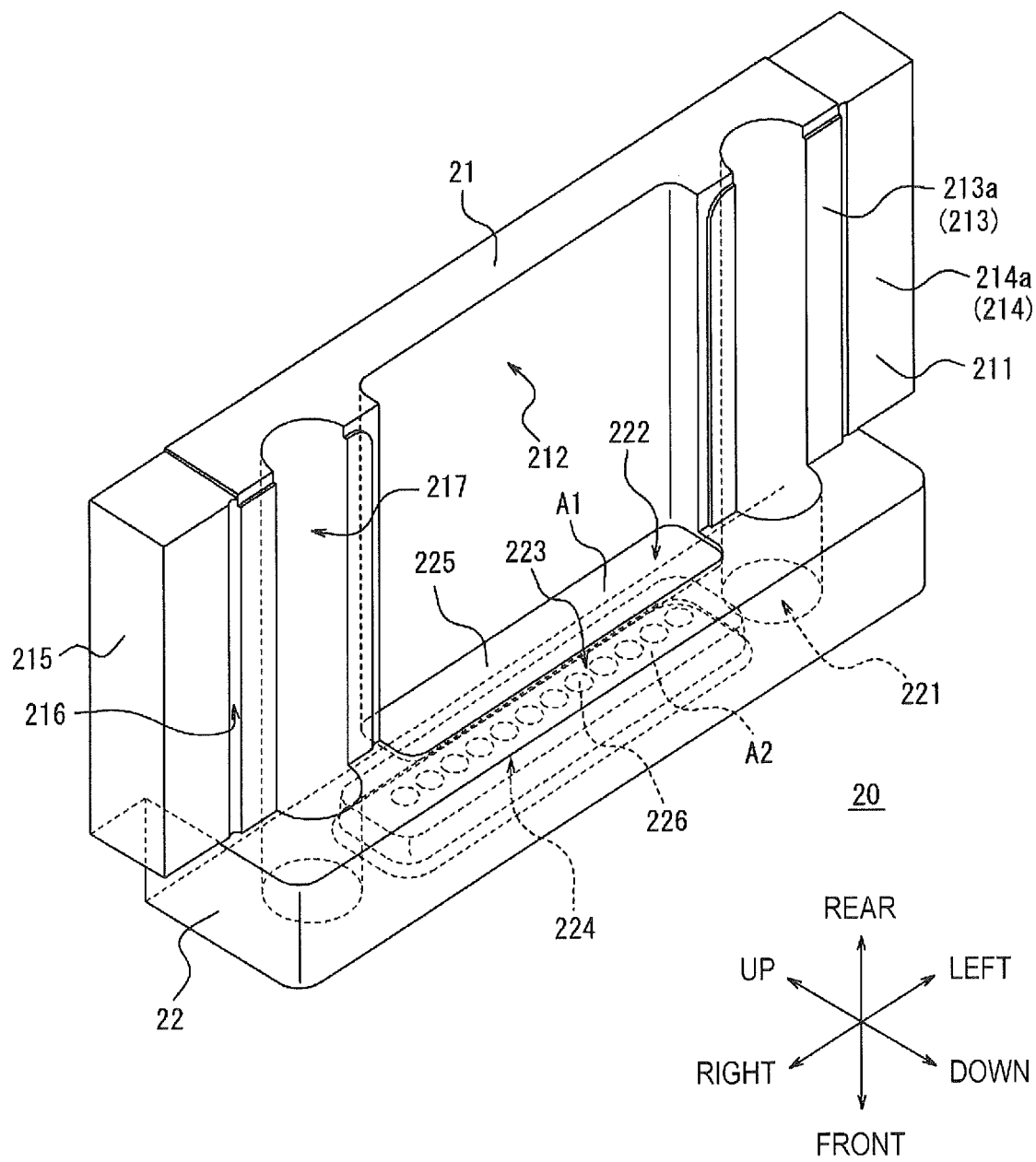
FIG. 3 is an external perspective view in which the optical connector illustrated in FIG. 1 is solely illustrated.

FIG. 3 is an external perspective view in which the optical connector 20 illustrated in FIG. 1 is solely illustrated. An example of the configuration of the optical connector 20 illustrated in FIG. 1 will be mainly described with reference to FIG. 3.

For example, the optical connector 20 is made of a translucent resin material and has an L-shape. A first lens unit 225 (hereinafter simply referred to as "first lens") formed in a first side surface A1 facing an end surface of the optical transmission line 10, which will be mentioned later, and second lens units 226 (hereinafter simply referred to as "second lenses") formed in a second side surface A2 that is located on a side opposite to the side on which the first side surface A1 is located are each made of, for example, a translucent resin material. For example, the optical connector 20 is made of a material having a refractive index that approximates the refractive index of each of the cores 121 of the optical waveguide 12.

A material of the optical connector 20 includes, for example, polyetherimide (PEI). The material of the optical connector 20 is not limited to PEI and may include, for example, any other resin materials such as Polycarbonate (PC) and polymethyl methacrylate (PMMA). The refractive index of the optical connector 20 is within a range of, for example, 1.4 or more and 1.7 or less. The refractive index of the optical connector 20 varies with the wavelength of propagating light and the temperature. The material of the optical connector 20 is not limited to those mentioned above and may include another material other than a resin material. In this case, the first lens 225 and the second lenses 226 of the optical connector 20, which will be described later, may each be made of a material other than a resin material.

The optical connector 20 includes a first base 21 extending in the longitudinal direction. The optical connector 20 has a bottom surface 211 that is the same as bottom surfaces of side walls 215, which will be described later, in the first base 21. The optical connector 20 includes a recess 212 formed at the center of a bottom surface 211 of the first base 21 in the transverse direction so as to be more recessed than the bottom surface 211 toward the upper side of the first base 21, that is, toward the inner side of the first base 21.

The optical connector 20 includes contact portions 213 each projecting toward the outside of the first base 21 in the vertical direction further than the bottom surface 211. One of the contact portions 213 is positioned on the left side of the recess 212, and the other contact portion 213 is positioned on the right side of the recess 212. Each of the contact portions 213 includes a lowermost portion of the first base 21 in the downward direction, that is, a contact surface 213a located at an end of the first base 21. Each of the contact surfaces 213a is formed at the most protruding position in the first base 21 toward the optical transmission line 10. Each of the contact surfaces 213a forms a lower end surface of the first base 21. The contact portions 213 and the contact surfaces 213a extend over substantially the entire first base 21 in the longitudinal direction.

The optical connector 20 includes first bonding portions 214. In the first base 21, the first bonding portions 214 are formed in regions in which the contact portions 213 are not formed. The first bonding portions 214 each include a portion of the bottom surface 211 of the first base 21. Each of the first bonding portions 214 is located outside a corresponding one of the contact portions 213 in the transverse direction. One of the first bonding portions 214 is positioned on the left side of the recess 212, and the other first bonding portions 214 is positioned on the right side of the recess 212. The first bonding portions 214 each include a bonding surface 214a located above a corresponding one of the contact surfaces 213a, that is, located further toward the inner side of the first base 21 than the contact surface 213a. In the first base 21, the bonding surfaces 214a are located on the side opposite to the side on which the optical transmission line 10 is disposed with respect to the contact surfaces 213a. In the first base 21, the area of each of the bonding surfaces 214a is larger than the area of the corresponding contact surface 213a. The first bonding portions 214 and the bonding surfaces 214a extend over the entire first base 21 in the longitudinal direction.

The optical connector 20 includes the side walls 215 fainting side end portions of the first base 21. One of the side walls 215 is positioned on the left side of the recess 212, and the other side wall 215 is positioned on the right side of the recess 212. Each of the first bonding portions 214 is included in a corresponding one of the side walls 215. The bonding surfaces 214a of the first bonding portions 214 form the bottom surfaces of the side walls 215, that is, portions of the bottom surface 211. The side walls 215 project toward opposite sides in the transverse direction such that one of the side walls 215 is located on the left side of a second base 22 (described later) and that the other side wall 215 is located on the right side of the second base 22. The side walls 215 extend, at the side end portions of the first base 21, over the entire first base 21 in the longitudinal direction.

The optical connector 20 includes relief concave portions 216 each of which is formed in the first base 21 so as to separate one of the contact portions 213 and the corresponding first bonding portion 214 from each other. The relief concave portions 216 are each formed in, for example, a groove shape so as to serve as a relief groove. Each of the relief concave portions 216 is sandwiched between one of the contact portions 213 and the corresponding first bonding portion 214. One of the relief concave portions 216 is positioned on the left side of the recess 212, and the other the relief concave portion 216 is positioned on the right side of the recess 212. The relief concave portions 216 extend over the entire first base 21 in the longitudinal direction.

The optical connector 20 includes positioning portions 217 each of which is formed in a recessed manner in the first base 21 such that each of the contact portions 213 is sandwiched by one of the positioning portions 217 and a corresponding one of the side walls 215. From another standpoint, each of the positioning portions 217 is recessed in a center portion of the corresponding contact portion 213. One of the positioning portions 217 is positioned on the left side of the recess 212, and the other positioning portion 217 is positioned on the right side of the recess 212. The positioning portions 217 extend over the entire first base 21 in the longitudinal direction. The positioning portions 217 are formed so as to be continuous with through holes 221 of the second base 22 (described below) and to extend to the rear end of the first base 21. The positioning portions 217 are each a concave portion formed so as to have a semicircular shape when viewed in cross section. Each of the positioning portions 217 is formed concentrically with one of the through holes 221.

The optical connector 20 has an L-shape and includes the second base 22 projecting from the first base 21 in a direction perpendicular to the direction in which the first base 21 extends. The second base 22 is formed in such a manner as to project further toward the front side than the first base 21 and to be contiguous to the first base 21. The second base 22 is formed in such a manner as to project downward from the first base 21. The second base 22 has the first side surface A1 and the second side surface A2, which will be described later.

The through holes 221 are each formed in the optical connector 20 so as to extend between the front surface to the rear surface of the second base 22 and to have a circular shape when viewed in cross section. One of the through holes 221 is formed in a left end portion of the second base 22 so as to correspond to one of the positioning portions 217 of the first base 21, and the other through hole 221 is formed in a right end portion of the second base 22 so as to correspond to the other positioning portion 217 of the first base 21. One of the through holes 221 is positioned on the left side of the recess 212 of the first base 21, and the other through hole 221 is positioned on the right side of the recess 212.

The optical connector 20 includes a first cutout portion 222 formed by cutting out an inner surface of the second base 22, that is, the rear surface of the second base 22, so as to reach the first side surface A1. The first cutout portion 222 has a recessed shape. The optical connector 20 includes a second bonding portion 223 defined by four side surfaces, which are the top, bottom, left, and right surfaces defining the first cutout portion 222, the first side surface A1, and an inner surface of the second base 22 located directly under the first cutout portion 222.

The optical connector 20 includes a second cutout portion 224 formed by cutting out an outer surface of the second base 22, that is, the front surface of the second base 22, so as to reach the second side surface A2. The second cutout portion 224 has a recessed shape.

The optical connector 20 includes, for example, the single first lens 225 formed over substantially the entire first side surface A1, which partially defines the first cutout portion 222, in the transverse direction and having a large radius of curvature. For example, the first lens 225 is a single lens formed so as to be gently curved along the transverse direction in the first side surface A1. Unlike the number of the cores 121 of the optical transmission line 10, for example, the only one first lens 225 is formed. The number of the first lenses 225 is smaller than the number of the second lenses 226, which will be described below, The optical connector 20 includes the multiple second lenses 226 formed in the second side surface A2, which partially defines the second cutout portion 224 and which is located on a side opposite to the side on which the first side surface A1 is located in the light propagation direction. The multiple second lenses 226 are arranged in a row in the first direction perpendicular to the light propagation direction. The multiple second lenses 226 are formed over substantially the entire second side surface A2 in the transverse direction. In the second side surface A2, the second lenses 226 are formed at positions facing the first lens 225 in the light propagation direction. Each of the second lenses 226 is a lens curved so as to have a radius of curvature that is sufficiently smaller than the radius of curvature of the first lens 225. The number of the second lenses 226 corresponds to the number of the cores 121 of the optical transmission line 10.

Figure 4:
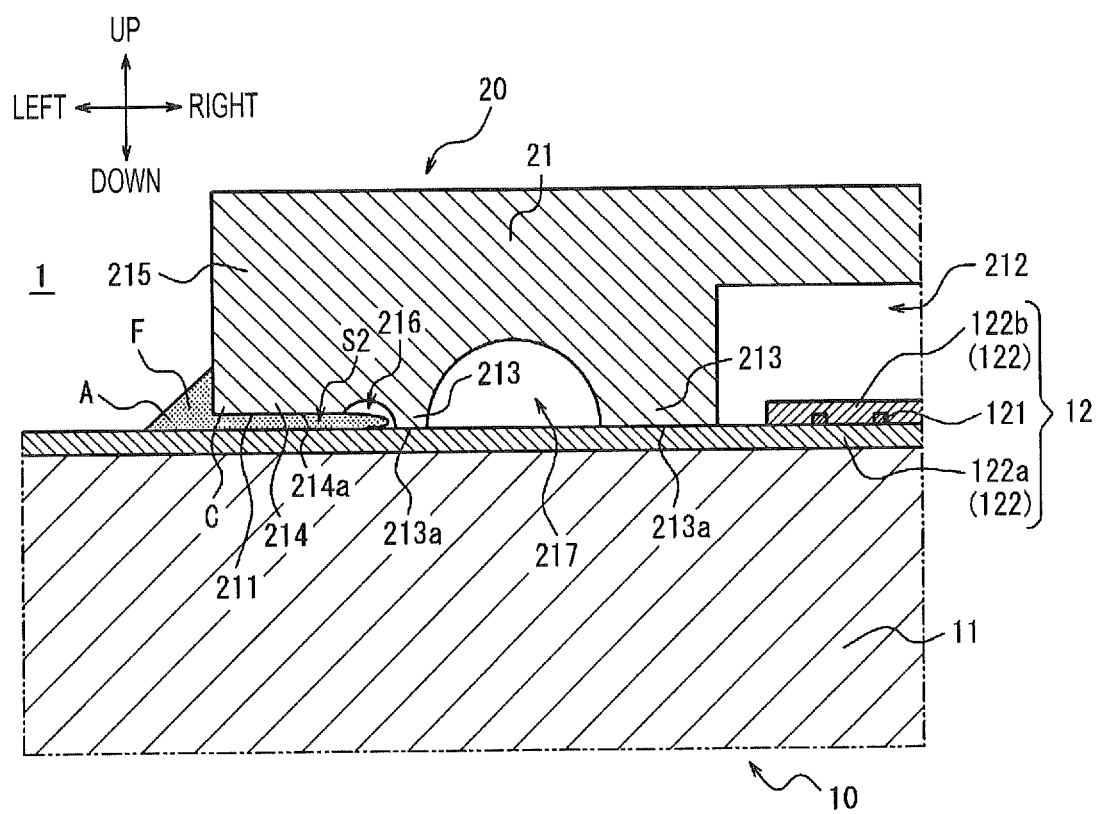
FIG. 4 is a diagram schematically illustrating a cross section of the optical connector module illustrated in FIG. 1 when viewed from the front.

FIG. 4 is a diagram schematically illustrating a cross section of the optical connector module 1 illustrated in FIG. 1 when viewed from the front. A configuration and a function of the optical connector 20 relating to the optical transmission line 10 will now be mainly described with reference to FIG. 4.

In the first step of the above-described mounting method, the optical connector 20 is placed on the optical waveguide 12 from above the optical transmission line 10, and accordingly, the first base 21 is placed on the optical transmission line 10. For example, the contact portions 213 included in the first base 21 are bring into contact with a placement surface of the optical transmission line 10. For example, the contact surfaces 213a, each of which is formed as an end surface of the first base 21, are brought into contact with the top surface of the first cladding 122a of the optical waveguide 12.

In the manner described above, the position of the optical connector 20 with respect to the optical transmission line 10 in the vertical direction is determined on the basis of the contact between the contact surfaces 213a of the first base 21 and the top surface of the first cladding 122a of the optical waveguide 12.

In addition, in the first step of the above-described mounting method, the optical connector 20 may be positioned with respect to the optical transmission line 10 in the longitudinal direction and the transverse direction by a suitable method. For example, the optical connector 20 may be positioned in the longitudinal direction and the transverse direction by engaging each of the positioning portions 217 with a stud pin formed on the first cladding 122a.

The first bonding portions 214 are spaced apart from a front surface of the optical transmission line 10. For example, the bonding surfaces 214a which are located further toward the inner side of the first base 21 than the contact surfaces 213a are spaced apart from the top surface of the first cladding 122a of the optical waveguide 12. In this case, second spaces S2 are formed between the first bonding portions 214 and the front surface of the optical transmission line 10, and an agent A attaching the optical connector 20 to the optical transmission line 10 is provided in the second spaces S2. Each of the second spaces S2 is surrounded by the front surface of the optical transmission line 10, one of the bonding surfaces 214a, and a corresponding one of the contact portions 213. More specifically, each of the second spaces S2 is surrounded by the top surface of the first cladding 122a, the corresponding bonding surface 214a, and an outer wall of the corresponding contact portion 213 in the transverse direction.

In the second step of the above-described mounting method, the agent A is injected into the second spaces S2 formed between the optical connector 20 and the optical transmission line 10 from the left and right sides of the optical connector 20. In this case, the agent A foul's a fillet F in the vicinity of a corner C of each of the side walls 215 of the optical connector 20. Even if the amount of the agent A is excessive, the surplus agent A is accommodated in the relief concave portions 216.

In the manner described above, in the second step of applying the agent A, the optical connector 20 is fixed to the optical transmission line 10 by the agent A. In this case, the agent A adheres to the bonding surfaces 214a of the optical connector 20. Similarly, the agent A adheres to the top surface of the first cladding 122a of the optical transmission line 10.

Figure 5:
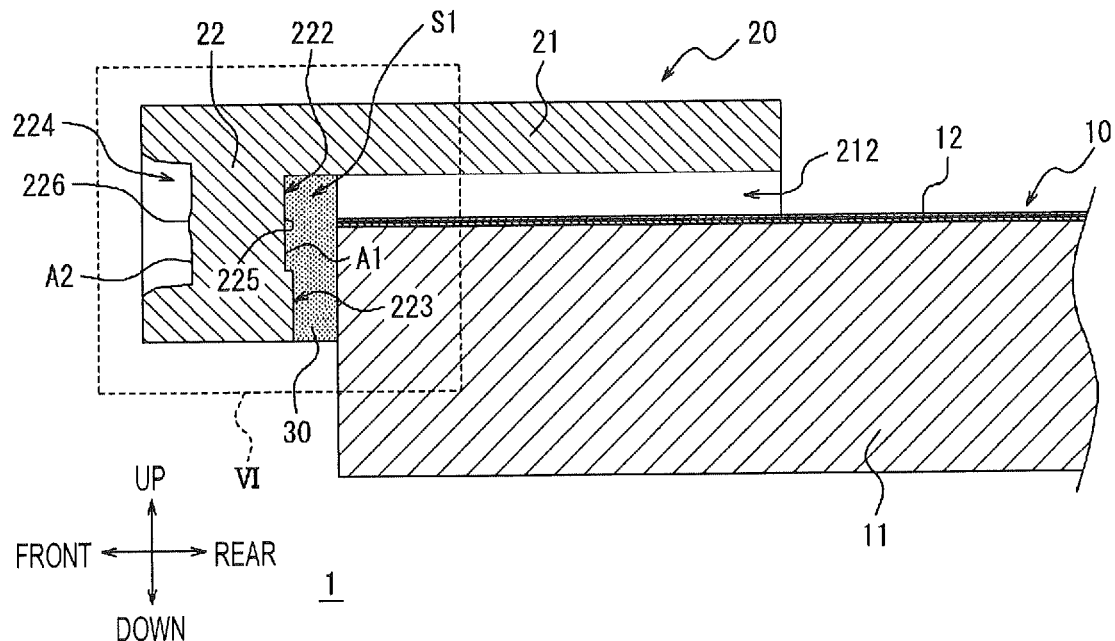
FIG. 5 is a sectional view taken along line V-V of FIG. 1.
Figure 6:
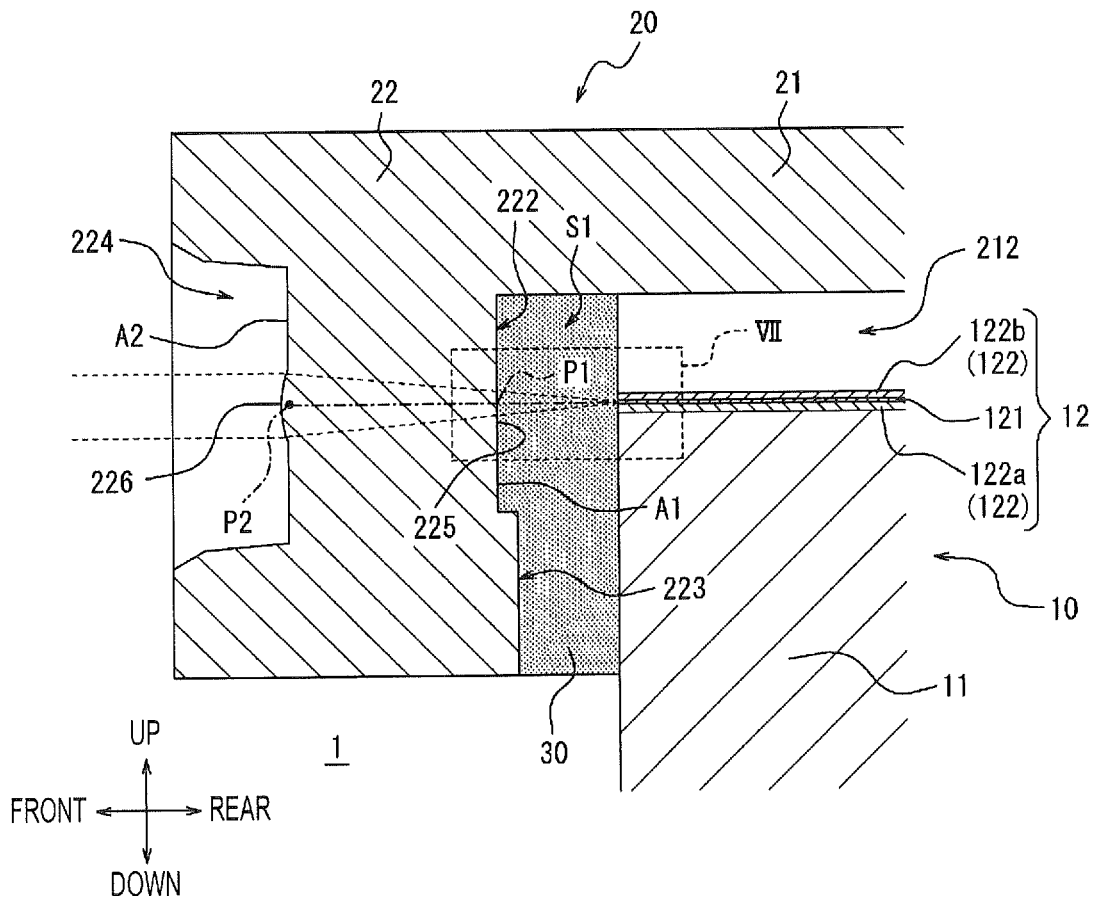
FIG. 6 is an enlarged view of a portion VI surrounded by a dashed line in FIG. 5.
Figure 7:
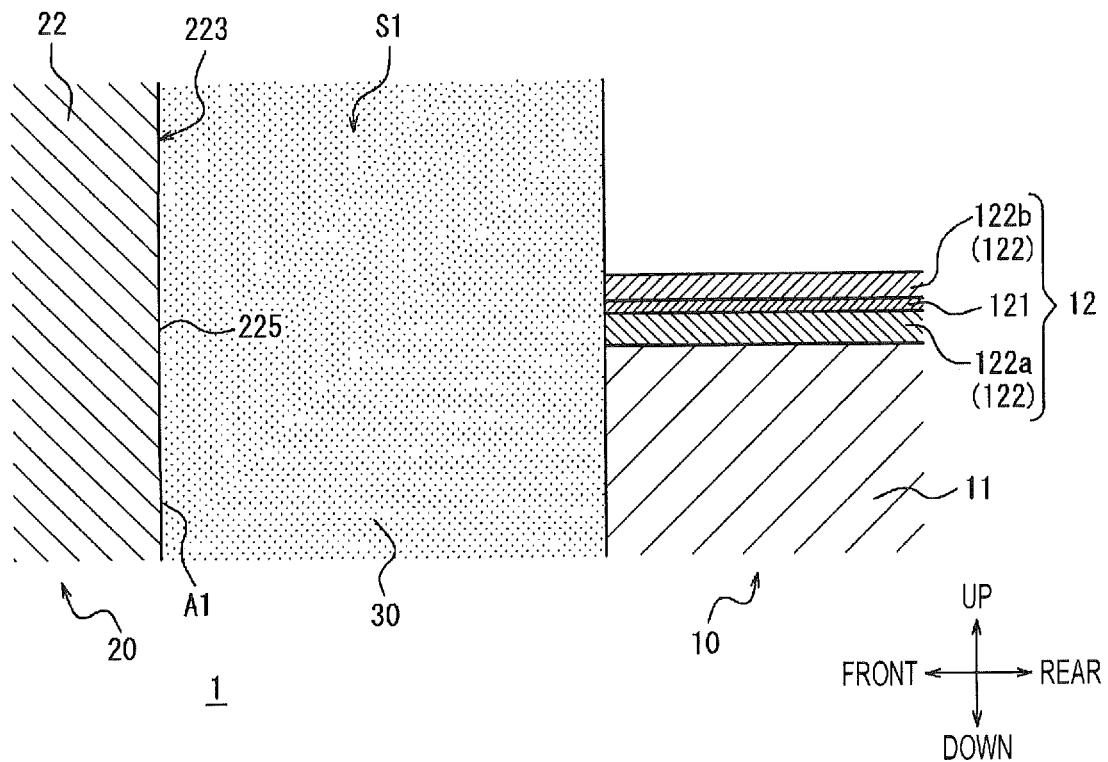
FIG. 7 is an enlarged view of a portion VII surrounded by a dashed line in FIG. 6.

FIG. 5 is a sectional view taken along line V-V of FIG. 1. FIG. 6 is an enlarged view of a portion VI surrounded by a dashed line in FIG. 5. FIG. 7 is an enlarged view of a portion VII surrounded by a dashed line in FIG. 6. A configuration and a function relating to the refractive-index matching agent 30 and an optical function of the optical connector 20 will now be mainly described with reference to FIG. 5 to FIG. 7.

As illustrated in FIG. 1, the optical connector 20 is placed on the optical waveguide 12 from above the optical transmission line 10. The optical connector 20 is disposed in such a manner as to cover a portion of the optical transmission line 10 by bringing the first base 21 into contact with the upper surface of the optical waveguide 12. The second base 22 is disposed in such a manner as to project forward from an end portion of the base body 11 and to project downward from the first base 21. The second base 22 projects downward such that the bottom surface thereof is positioned below the position of the optical waveguide 12 in the vertical direction. The second base 22 faces the front surface of the optical transmission line 10, that is, the end surface of the optical transmission line 10 perpendicular to the top surface of the optical transmission line 10.

In this case, as illustrated in FIG. 5, the first space S1 is formed between the optical transmission line 10 and the optical connector 20. The inner surface of the second base 22 of the optical connector 20 in which the first cutout portion 222 is formed is spaced apart from the end surface of the base body 11.

In the third step of the above-described mounting method, the refractive-index matching agent 30 is injected from below so as to fill the first space S1. The refractive-index matching agent 30 is made of a material having a refractive index that approximates the refractive index of each of the cores 121 of the optical transmission line 10. The material of the refractive-index matching agent 30 is set to an optimum material compatible with the refractive index of each of the cores 121 of the optical transmission line 10.

The material of the refractive-index matching agent 30 includes, for example, a polymer. The refractive-index matching agent 30 may be a so-called matching oil. The refractive index of the refractive-index matching agent 30 is within a range of, for example, 1.3 or more and 1.8 or less. The refractive index of the refractive-index matching agent 30 varies with the wavelength of propagating light and the temperature.

For example, a refractive index n1 of the optical connector 20 and a refractive index n2 of the refractive-index matching agent 30 has a relationship expressed by the following Inequality 1. The difference between the refractive index n1 and the refractive index n2 is equal to or less than 15% of the refractive index n2. In this case, the value of the refractive index n1 is equal to or greater than the value of the refractive index n2.

[Math. 1]

$$1 \leq n1/n2 \leq 1.15 \quad \text{(Inequality 1)}$$

The present disclosure is not limited to the above case, and the value of the refractive index n1 may be smaller than the value of the refractive index n2 as long as the difference between the refractive index n1 and the refractive index n2 is equal to or less than 15% of the refractive index n2.

A condition of Inequality 1 is calculated by using Snell's law in such a manner that the optical connector module 1 has a desired highly-accurate optical property. In the present specification, the phrase "desired highly-accurate optical property" refers to, for example, the coupling efficiency of light between the optical transmission line 10 and the optical connector 20 through the refractive-index matching agent 30 and includes a coupling efficiency higher than a predetermined value based on a required specification.

The refractive-index matching agent 30 is interposed between the end surface of the optical transmission line 10 and the first side surface A1 and adjusts the refractive index on an optical path between the cores 121 and the first side surface A1. For example, the refractive-index matching agent 30 is interposed between the end surface of the optical waveguide 12 and the first lens 225. In this case, the refractive-index matching agent 30 adheres to the second bonding portion 223 of the optical connector 20. Similarly, the refractive-index matching agent 30 adheres to the end surface of the optical transmission line 10. The refractive-index matching agent 30 is in close contact with the second bonding portion 223 and the end surface of the optical transmission line 10 in a state where the refractive-index matching agent 30 is injected in the first lens 225 and the first cutout portion 222. In the manner described above, the optical connector 20 is fixed to the optical transmission line 10 with the refractive-index matching agent 30.

The optical connector 20 is optically coupled to the optical waveguide 12 included in the optical transmission line 10 in a state where the optical connector 20 is fixed to the optical transmission line 10. As illustrated in FIG. 6, the first side surface A1 faces the end surface of the optical transmission line 10, that is, for example, end surfaces of the cores 121. Similarly, the first lens 225 faces the end surface of the optical waveguide 12, that is, for example, the end surfaces of the cores 121. The refractive-index matching agent 30 is interposed between the first lens 225 and the end surfaces of the cores 121.

As illustrated in FIG. 6, the second lenses 226 face the first lens 225 with the second base 22 of the optical connector 20 interposed therebetween. As an example, each of the second lenses 226 is formed on the second side surface A2 so as to have a convex shape. Each of the second lenses 226 is formed on the second side surface A2 so as to serve as a convex lens. In a cross-sectional view, such as that illustrated in FIG. 6, along the light propagation direction, each of the second lenses 226 is formed so as to have an arc shape. The half-width (the radius) of each of the second lenses 226 in the vertical direction is larger than the radius of each of the cores 121 of the optical transmission line 10.

In the second direction, which is perpendicular to the light propagation direction and to the first direction, a center P1 of the first lens 225 through which the optical axis passes coincides with a center P2 of the second lenses 226 when the second lenses 226 are seen as a whole (hereinafter referred to as "center P2 of the aggregate of the second lenses 226"). The center P1 of the first lens 225 and the center P2 of the aggregate of the second lenses 226 are located at the same position in the vertical direction.

As an example, how light propagates when the light is emitted from the end surface of the optical transmission line 10 will now be described with reference to FIG. 6. The following description is based on the premise that the optical transmission line 10 transmits light from a light emitting device. The present disclosure is not limited to this case, and the optical transmission line 10 may transmit light to a light receiving device. In this case, it is to be understood that the following description holds true with a light propagation direction that is opposite to the above-mentioned light propagation direction.

In the case where the refractive-index matching agent 30 is made of a material having a refractive index that approximates the refractive index of each of the cores 121, the Fresnel reflection of light that is incident on an interface between the refractive-index matching agent 30 and the cores 121 is reduced by refractive index matching. Thus, the light that is incident on the interface is emitted into the refractive-index matching agent 30 with a high transmittance.

Light emitted from the cores 121 is incident on the first lens 225 while being caused to spread out by diffraction effect in the refractive-index matching agent 30. In the case where the optical connector 20 is made of a material having a refractive index that approximates the refractive index of the refractive-index matching agent 30, the Fresnel reflection of light that is incident on an interface between the optical connector 20 and the refractive-index matching agent 30 is reduced by refractive index matching. Thus, the light that is incident on the interface is emitted to the optical connector 20, that is, for example, into the second base 22, with a high transmittance.

As will be described later, in the case where the first lens 225 is formed as a concave lens, the light emitted into the second base 22 is incident on the second lenses 226 while further spreading out. In the case where each of the second lenses 226 is formed as a convex lens, light that is incident on an interface between the outside and the optical connector 20 is collimated by, for example, the second lenses 226. In this manner, for example, the optical connector module 1 collimates light emitted from the optical transmission line 10 and propagates the collimated light to the outside.

Light emitted from the optical connector module 1 is coupled to another optical transmission line. For example, the light is coupled to the optical fiber held by the ferrule, which is connected to the optical connector 20. For example, the light is coupled to an optical waveguide to which another optical connector connected to the optical connector 20 is attached.

FIG. 7 illustrates the end surface of the optical transmission line 10 illustrated in FIG. 1. As illustrated in FIG. 7, the end surface of the optical waveguide 12 is flush with the end surface of the base body 11. The end surfaces of the cores 121 and the end surface of the cladding 122 are formed on the same plane along the end surface of the base body 11. However, the present disclosure is not limited to this case, the end surface of the optical waveguide 12, that is, for example, the end surfaces of the cores 121, may be curved surfaces protruding toward the optical connector 20. For example, the end surfaces of the cores 121 may each be a curved surface protruding further toward the optical connector 20 than the end surface of the cladding 122.

FIG. 8 is an enlarged cross-sectional view taken along line VIII-VIII of FIG. 1. FIG. 8 illustrates a region from an end channel CH1 that is one of multiple transmission channels included in the optical transmission line 10 and that is located on the left-hand side to a center channel CH2 that is positioned in the middle among the multiple transmission channels in the transverse direction.

As an example, the first lens 225 is formed in the first side surface A1 so as to have a concave shape. The first lens 225 is formed in the first side surface A1 so as to serve as a concave lens. The first lens 225 is gently curved so as to have an arc shape along the first direction perpendicular to the light propagation direction. The radius of curvature of the first lens 225 is sufficiently larger than the radius of curvature of each of the second lenses 226.

The first lens 225 is formed so as to overlap all the multiple second lenses 226 in the first direction perpendicular to the light propagation direction. In the first direction perpendicular to the light propagation direction, the center P1 of the first lens 225, through which the optical axis passes, coincides with the center P2 of the aggregate of the second lenses 226. The center P1 of the arc shape of the first lens 225 along the transverse direction coincides with the center P2 of the aggregate of the second lenses 226 in the transverse direction.

The radius of curvature of the first lens 225 is within a range of, for example, 200 mm or more and 400 mm or less. The radius of curvature of the first lens 225 may be, for example, 250 mm. The radius of curvature of each of the second lenses 226 is within a range of, for example, 0.2 mm or more and 0.5 mm or less.

For example, a surface-to-surface distance L illustrated in FIG. 8 corresponds to an optical path length between a lens surface of the first lens 225 and a lens surface of each of the second lenses 226. Such a surface-to-surface distance L varies depending on the position of each of the second lenses 226 in the transverse direction. For example, the surface-to-surface distance L is within a range of, for example, 1.0 mm or more and 2.0 mm or less.

For example, a channel-to-channel pitch P illustrated in FIG. 8 corresponds to the distance between the center of one of the second lenses 226 in the transverse direction and the center of another one of the second lenses 226 in the transverse direction, the other second lens 226 being adjacent to the one second lens 226. Such a channel-to-channel pitch P is within a range of, for example, 0.125 mm or more and 0.250 mm or less. The channel-to-channel pitch P may be the same among the multiple second lenses 226. The multiple second lenses 226 may be formed so as to be equally spaced in the transverse direction. In this case, the transmission channels of the optical transmission line 10 are also equally spaced in the transverse direction, and the lateral position of each of the second lenses 226 is the same as or similar to the lateral position of a corresponding one of the transmission channels.

The parameters of the optical connector 20 including the radius of curvature of the first lens 225, the radius of curvature of each of the second lenses 226, the surface-to-surface distance L, the channel-to-channel pitch P, and the refractive index n1 of the optical connector 20 are set also in relation to the core size and the refractive index of each of the cores 121, the refractive index of the cladding 122, and the refractive index n2 of the refractive-index matching agent 30 such that a desired highly-accurate optical property can be obtained.

For example, the parameters of the optical connector 20 are set such that diffused light emitted from the cores 121 of the optical transmission line 10 is incident on the first lens 225 by passing through the refractive-index matching agent 30 and is emitted from the second lenses 226 as collimated light to the outside of the optical connector 20. For example, the parameters of the optical connector 20 are set such that collimated light that is incident on the second lenses 226 from outside the optical connector 20 passes through the first lens 225 and the refractive-index matching agent 30 and is concentrated onto the cores 121 of the optical transmission line 10.

For example, the radius of curvature of the first lens 225 and the radius of curvature of each of the second lenses 226 are set depending on the surface-to-surface distance L.

Figure 9A:
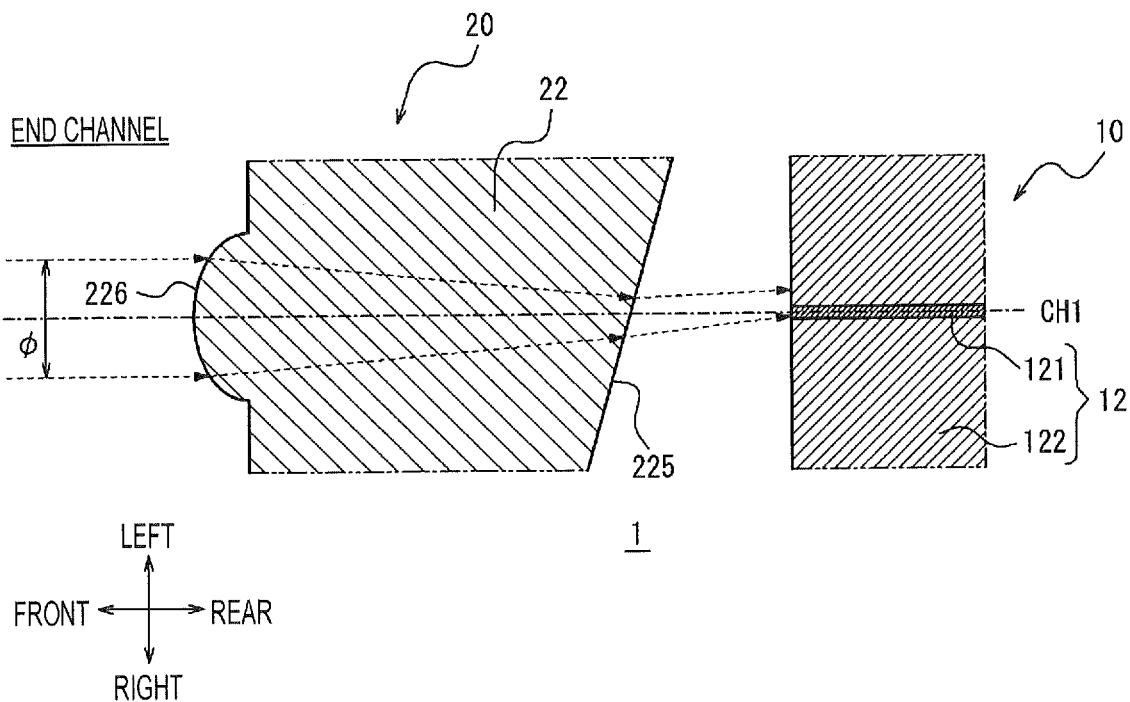
FIG. 9A is a schematic diagram illustrating how light propagates in an end channel illustrated in FIG. 8 in the case where a refractive-index matching agent is not provided.
Figure 9B:
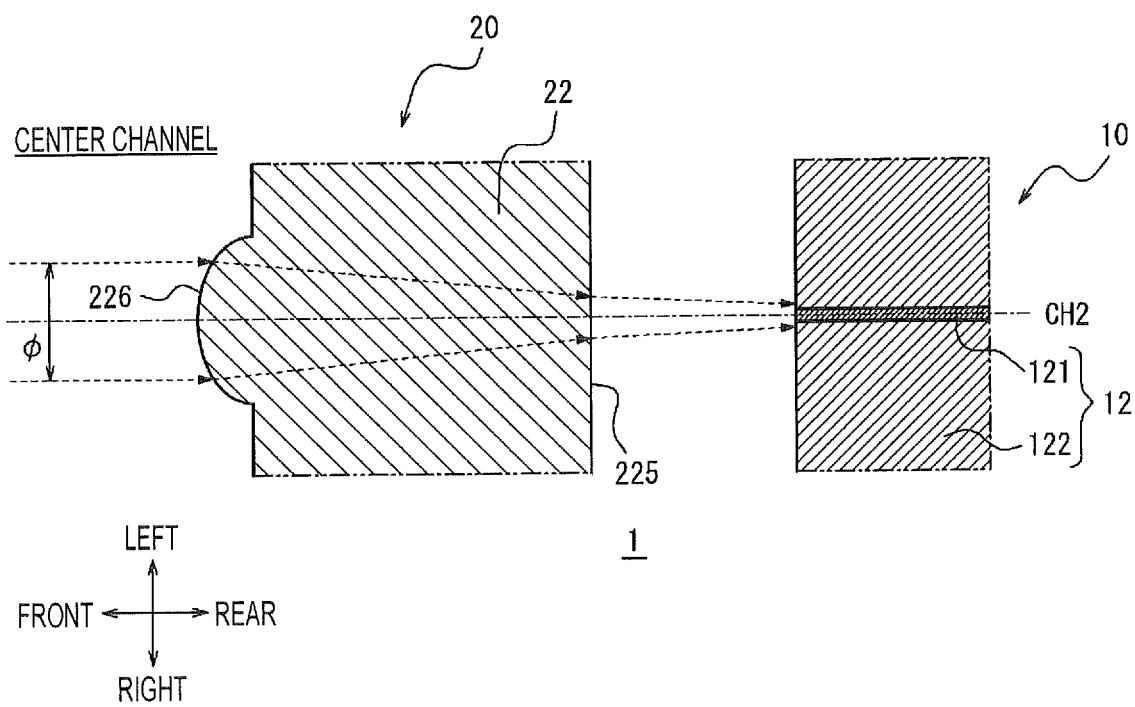
FIG. 9B is a schematic diagram illustrating how light propagates in a center channel illustrated in FIG. 8 in the case where the refractive-index matching agent is not provided.

FIG. 9A is a schematic diagram illustrating how light propagates in the end channel CH1 illustrated in FIG. 8 in the case where the refractive-index matching agent 30 is not provided. FIG. 9B is a schematic diagram illustrating how light propagates in the center channel CH2 illustrated in FIG. 8 in the case where the refractive-index matching agent 30 is not provided.

Unlike the present disclosure, in the case illustrated in FIG. 9A and FIG. 9B, the refractive-index matching agent 30 is not provided between the optical connector 20 and the optical transmission line 10, and light propagates through the air. Before describing an optical function of the refractive-index matching agent 30 with reference to FIG. 10A and FIG. 10B, propagation of light in the case where the refractive-index matching agent 30 is not provided will now be mainly described as a comparative example.

In FIG. 9A, in order to simplify the description by emphasizing the arc shape of the first lens 225 in the end channel CH1, left and right end portions of the first lens 225 are each schematically illustrated so as to be greatly inclined like an inclined surface. However, each of the left and right end portions of the first lens 225 actually forms a portion of an arc that is gently curved in the transverse direction.

As illustrated in FIG. 9A and FIG. 9B, a light beam having a beam diameter φ is incident on each of the second lenses 226, which correspond to their respective channels, from outside the optical connector 20. The beam diameter φ is within a range of, for example, 75 μm or more and 100 μm or less.

In this case, for example, in the center channel CH2, the light that has been incident on one of the second lenses 226 and has passed through the inside of the optical connector 20 is incident on the lens surface of the first lens 225 that is close in shape to a flat surface along the first direction perpendicular to the light propagation direction.

In the center channel CH2, the light that has been incident on the lens surface of the first lens 225 is refracted at an angle that is calculated by Snell's law using the refractive index n1 of the optical connector 20 and the refractive index of the air. For example, the refractive index of the air is smaller than the refractive index n1 of the optical connector 20, and the lens surface of the first lens 225 is close in shape to a flat surface. In this case, the light that has passed through the first lens 225 converges so as to be partially concentrated onto the corresponding core 121 of the optical transmission line 10.

Similarly, for example, in the end channel CH1, the light that has been incident on one of the second lenses 226 and has passed through the inside of the optical connector 20 is incident on the lens surface of the first lens 225 that is close in shape to an inclined surface inclined at a predetermined angle along the first direction perpendicular to the light propagation direction.

In the end channel CH1, the light that has been incident on the lens surface of the first lens 225 is refracted at an angle that is calculated by Snell's law using the refractive index n1 of the optical connector 20 and the refractive index of the air. For example, the refractive index of the air is smaller than the refractive index n1 of the optical connector 20, and the lens surface of the first lens 225 is close in shape to an inclined surface. In this case, although the light that has passed through the first lens 225 converges, only a small portion of the light is coupled to the corresponding core 121 of the optical transmission line 10. A large portion of the light is radiated onto a portion of the optical transmission line 10 that is different from the core 121.

As illustrated in FIG. 9A and FIG. 9B, in the case where the refractive-index matching agent 30 is not provided and where there is a large refractive index difference between the optical connector 20 and the air, the refraction effect on the lens surface of the first lens 225 of the optical connector 20 is large. In addition, the first lens 225 is formed so as to have an arc shape gently curved in the transverse direction, and the shape of the lens surface of the first lens 225 varies from channel to channel depending on the lateral position of each channel. Thus, the coupling efficiency of the light emitted from the first lens 225 of the optical connector 20 with respect to the optical transmission line 10 differs from channel to channel.

Figure 10A:
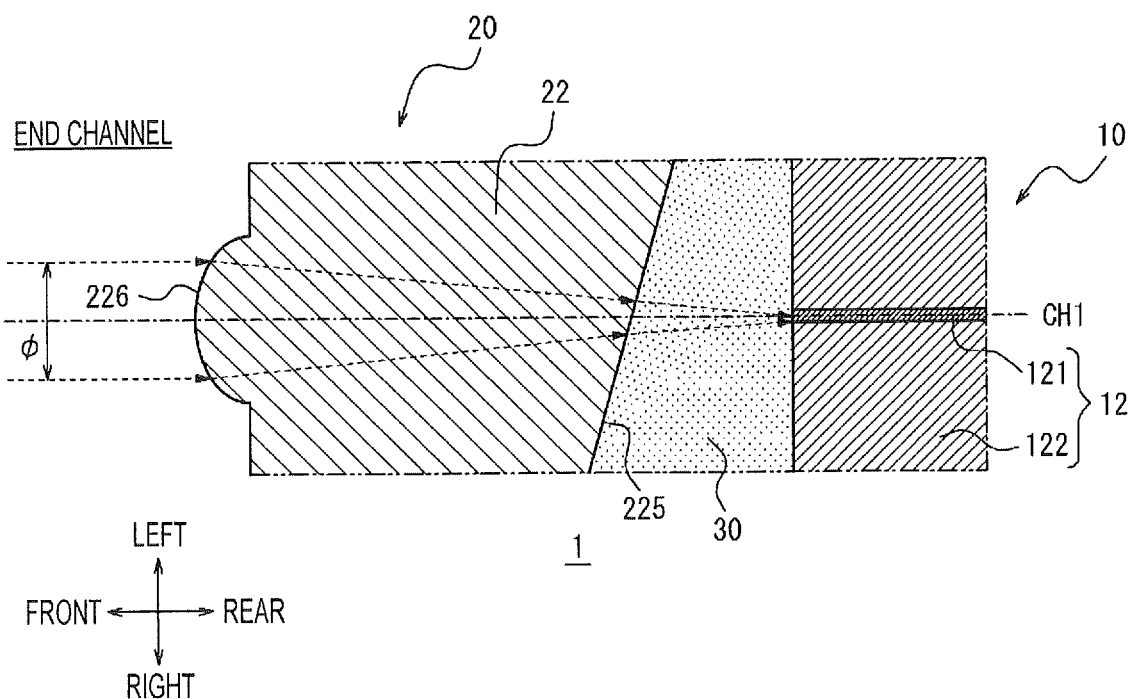
FIG. 10A is a schematic diagram corresponding to FIG. 9A in the case where the refractive-index matching agent is provided.
Figure 10B:
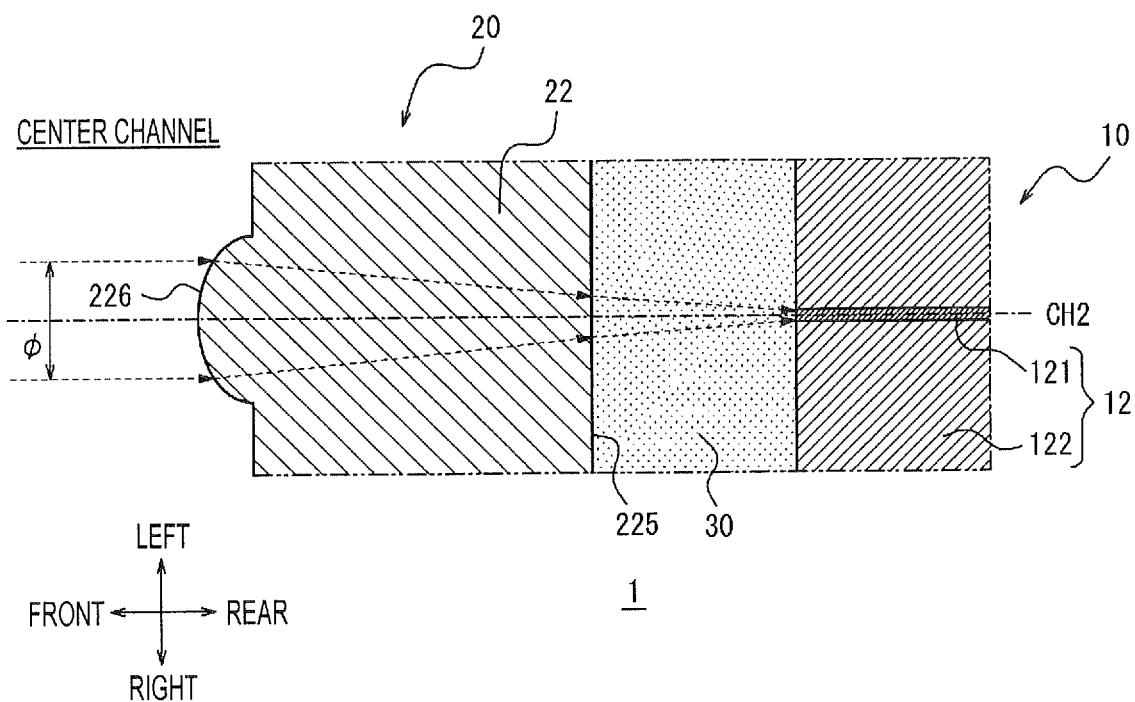
FIG. 10B is a schematic diagram corresponding to FIG. 9B in the case where the refractive-index matching agent is provided.

In the present disclosure, the refractive-index matching agent 30 reduces such variations in light coupling efficiency among the channels. FIG. 10A is a schematic diagram corresponding to FIG. 9A in the case where the refractive-index matching agent 30 is provided. FIG. 10B is a schematic diagram corresponding to FIG. 9B in the case where the refractive-index matching agent 30 is provided.

Unlike the case illustrated in FIG. 9A and FIG. 9B, in the case illustrated in FIG. 10A and FIG. 10B, the refractive-index matching agent 30 is provided between the optical connector 20 and the optical transmission line 10, and light propagates inside the refractive-index matching agent 30. The effectiveness of the refractive-index matching agent 30 of the present disclosure compared with the case illustrated in FIG. 9A and FIG. 9B will now be mainly described with reference to FIG. 10A and FIG. 10B.

As illustrated in FIG. 10A and FIG. 10B, a light beam having the beam diameter φ is incident on each of the second lenses 226, which correspond to their respective channels, from outside the optical connector 20. As in the case illustrated in FIG. 9A and FIG. 9B, the beam diameter φ is within a range of, for example, 75 μm or more and 100 μm or less.

In this case, for example, in the center channel CH2, the light that has been incident on one of the second lenses 226 and has passed through the inside of the optical connector 20 is incident on the lens surface of the first lens 225 that is close in shape to a flat surface along the first direction perpendicular to the light propagation direction.

Since the refractive index n1 of the optical connector 20 and the refractive index n2 of the refractive-index matching agent 30 satisfy a relationship such as that expressed by Inequality 1 and approximate each other, in the center channel CH2, the refraction effect of light that is incident on the lens surface of the first lens 225 is reduced. In the center channel CH2, occurrence of an angular change due to refraction of the light incident on the lens surface of the first lens 225 is reduced. In this case, if the optical connector 20 is formed faithfully to the parameters of the optical connector 20 set so as to satisfy a desired highly-accurate optical property, substantially all the light will be efficiently concentrated onto the cores 121 of the optical transmission line 10.

Similarly, for example, in the end channel CH1, the light that has been incident on one of the second lenses 226 and has passed through the inside of the optical connector 20 is incident on the lens surface of the first lens 225 that is close in shape to an inclined surface inclined at a predetermined angle along the first direction perpendicular to the light propagation direction.

Since the refractive index n1 of the optical connector 20 and the refractive index n2 of the refractive-index matching agent 30 satisfy a relationship such as that expressed by Inequality 1 and approximate each other, also in the end channel CH1, the refraction effect of light that is incident on the lens surface of the first lens 225 is reduced as in the center channel CH2. In the end channel CH1, occurrence of an angular change due to refraction of the light incident on the lens surface of the first lens 225 is reduced. In this case, if the optical connector 20 is formed faithfully to the parameters of the optical connector 20 set so as to satisfy a desired highly-accurate optical property, substantially all the light will be efficiently concentrated onto the cores 121 of the optical transmission line 10.

As illustrated in FIG. 10A and FIG. 10B, in the case where the refractive-index matching agent 30 is provided and where there is a small refractive index difference between the optical connector 20 and the refractive-index matching agent 30, the refraction effect on the lens surface of the first lens 225 of the optical connector 20 is small. Thus, even in the case where the first lens 225 is formed so as to have an arc shape gently curved in the transverse direction and where the shape of the lens surface of the first lens 225 varies from channel to channel depending on the lateral position of each channel, occurrence of an angular change due to refraction of light when the light passes through the lens surface of the first lens 225 is reduced uniformly in the transverse direction. As a result, the coupling efficiency of the light emitted from the first lens 225 of the optical connector 20 with respect to the optical transmission line 10 is improved uniformly in the transverse direction.

For example, even if there are variations in the shape of the first lens 225 among manufactured optical connectors 20, the coupling efficiency of light emitted from the first lens 225 with respect to the optical transmission line 10 in each of the optical connectors 20 is uniformly improved by the presence of the refractive-index matching agent 30.

According to the optical connector 20 of the above-described embodiment, even in the case where the optical connector 20 includes the first lens 225 and the second lenses 226, a desired highly-accurate optical property can be easily obtained. For example, the number of the first lenses 225 is smaller than and is not the same as the number of the second lenses 226, so that it is not necessary to cause the first lens 225 and the second lenses 226 to correspond in one-to-one to each other. Unlike the related art, it is not necessary to align the optical axis of a first lens and the optical axis of a second lens with high accuracy on a one-to-one basis.

Thus, the degree of freedom regarding the optical design of the first lens 225 and the second lenses 226 increases. For example, the radius of curvature of the first lens 225 can be set to be larger than the radius of curvature of each of the second lenses 226. Even if warpage, shrinkage, and the like occur in a member included in the optical connector 20 during manufacturing due to thermal strain or the like caused by a property of the material used for forming the optical connector 20, and the optical design value of each of the second lenses 226 slightly deviates with respect to the first lens 225, a desired optical design relating to the first lens 225 and the second lenses 226 can be easily realized. As a result, a desired highly-accurate optical property of the optical connector module 1 can be easily maintained.

The optical connector 20 includes the first lens 225 and the second lenses 226, so that the optical connector 20 can perform in optical adjustment by using a lens system that is formed by combining the first lens 225 and the second lenses 226. The optical connector 20 can improve the degree of freedom regarding the optical adjustment by using two lenses. As a result, the optical connector module 1 can easily provide emitted light in a desired beam state.

Since the single first lens 225 is provided, the positions at which the multiple second lenses 226 are formed may be determined only with respect to the single first lens 225. As a result, the degree of freedom regarding the optical design of the first lens 225 and the second lenses 226 further increases, and a desired highly-accurate optical property of the optical connector module 1 can be more easily maintained.

In addition, unlike the case where multiple first lenses 225 are formed in the first side surface A1, a fine forming process is not necessary, and the process of forming the first lens 225 in the first side surface A1 is easily performed.

The single first lens 225 is formed in the first side surface A1 so as to have an arc shape gently curved in the transverse direction, so that the forming process is more easily performed compared with the case where the first side surface A1 is formed as a completely flat surface without forming the first lens 225 in the first side surface A1. For example, in the case of performing a forming process that is performed by using a resin material like the process of forming the optical connector 20, warpage, shrinkage, and the like are likely to occur in a member during the manufacture of the optical connector 20. Thus, it has been difficult to form an ideal flat surface that is optically required in the first side surface A1. In the present disclosure, by utilizing such warpage, shrinkage, and the like that occur in a member rather than reducing them, the single first lens 225 having an arc shape gently curved in the transverse direction can be easily formed in the first side surface A1.

The multiple second lenses 226 are arranged in a row in the first direction perpendicular to the light propagation direction, so that the optical connector 20 can also be optically coupled to the optical transmission line 10 including the multiple transmission channels arranged in a row in the same direction. Thus, the optical connector module 1 can transmit multiple optical signals in parallel on the basis of the multiple transmission channels formed in such a manner as to extend from the optical transmission line 10 to the optical connector 20. This improves the efficiency of transmission of optical signals using the optical connector module 1.

The first lens 225 is formed so as to overlap all the multiple second lenses 226 in the first direction perpendicular to the light propagation direction, so that the first lens 225 can optically act on light passing through each of the multiple second lenses 226. As a result, the optical adjustment using the lens system, which is formed by combining the first lens 225 and the second lenses 226, can be performed for each of the multiple transmission channels in the optical connector module 1. The optical connector module 1 can improve the degree of freedom regarding the optical adjustment for each of the multiple transmission channels by using two lenses. As a result, the optical connector module 1 can easily provide emitted light in a desired beam state for each of the multiple transmission channels.

In the first direction perpendicular to the light propagation direction and the second direction, which is perpendicular to the light propagation direction and to the first direction, the center P1 of the first lens 225, through which the optical axis passes, coincides with the center P2 of the aggregate of the second lenses 226, so that the first lens 225 having an arc shape and the aggregate of the second lenses 226 are symmetrically arranged in the vertical direction and the transverse direction. Consequently, the multiple transmission channels located on the left-hand side and the multiple transmission channels located on the right-hand side with respect to the center of the optical connector module 1 in the transverse direction can obtain the same optical property. As a result, the uniformity of the optical properties of all the multiple transmission channels in the optical connector module 1 is improved.

The radius of curvature of the first lens 225 is larger than the radius of curvature of each of the second lenses 226, so that the first lens 225 formed in the first side surface A1 does not necessarily have a fine structure such as that of each of the second lenses 226 formed on the second side surface A2. Thus, the first lens 225 is easily formed in the first side surface A1.

The first lens 225 is formed as a concave lens, so that the optical connector 20 can forcibly cause light emitted from the cores 121 of the optical transmission line 10 to spread out. For example, the concave lens is formed at a position in the first side surface A1, the position facing the cores 121, so that light that is reduced by the refractive-index matching agent 30 from spreading out can be forcibly caused to spread out at an early stage after emission. Conversely, light that is incident on the first lens 225 from outside the optical connector 20 by passing through the second lenses 226 can be concentrated and efficiently coupled to the cores 121.

The second lenses 226 are each formed as a convex lens, so that the optical connector 20 can convert, for example, light spread by the first lens 225, which is a concave lens, into collimated light. The optical connector 20 can provide a large-diameter collimated light beam by using a combination of a concave lens, which is the first lens 225, and at least one convex lens, which is at least one of the second lenses 226. As a result, the optical connector 20 can provide collimated light that can be efficiently concentrated onto a smaller spot. The optical connector 20 can radiate collimated light having a favorable property.

The optical connector 20 can increase the tolerance of optical coupling by using a large-diameter collimated light beam. In other words, the optical connector 20 can perform optical coupling within a predetermined tolerance even if the optical axis thereof and the optical axis of another optical transmission line, which is an optical coupling target, are slightly misaligned.

The second lenses 226 are each formed as a convex lens, so that the optical connector 20 can concentrate light that is incident on the second lenses 226 as collimated light. The optical connector 20 can effectively concentrate light by using a combination of a concave lens, which is the first lens 225, and at least one convex lens, which is at least one of the second lenses 226. As a result, the optical connector 20 can efficiently couple light to the cores 121 of the optical transmission line 10.

The optical connector 20 includes the first base 21 and the second base 22 and is formed so as to have an L shape, and the second base 22 facing the end surface of the optical transmission line 10 has the first side surface A1 and the second side surface A2, so that the first lens 225 and the second lenses 226 can be compactly arranged at an end of the L shape. Thus, even in the state where the optical connector 20 has been reduced in size, a desired highly-accurate optical property can be easily obtained.

The optical connector 20 is made of a resin material, so that warpage, shrinkage, and the like are likely to occur in a member during the manufacture of the optical connector 20. Even in such a case, as mentioned above, a desired optical design relating to the first lens 225 and the second lenses 226 can be easily realized. As a result, a desired highly-accurate optical property of the optical connector module 1 can be easily maintained.

The optical connector module 1 includes the refractive-index matching agent 30, which is interposed between the end surface of the optical transmission line 10 and the first side surface A1, so that the coupling loss between the optical transmission line 10 and the optical connector 20 can be reduced. For example, the refractive-index matching agent 30 is interposed between the end surface of the optical waveguide 12 and the first lens 225, so that the optical connector module 1 can reduce a loss due to the diffraction effect, a loss associated with scattering or absorption of light by a foreign substance that enters the first space S1 from the outside, a loss due to the Fresnel reflection, and the like.

More specifically, the refractive-index matching agent 30 having a refractive index that approximates the refractive index of each of the cores 121, is placed in the optical path, so that, the optical connector module 1 can reduce the degree of spreading of light due to the diffraction effect compared with light in the air. As a result, the optical connector module 1 can reduce the percentage of light that is not coupled to the first lens 225 due to the diffraction effect.

The refractive-index matching agent 30 also serves to reduce entry of a foreign substance. By filling the first space S1 with the refractive-index matching agent 30, the optical connector module 1 can reduce entry of a foreign substance from the outside. As a result, the optical connector module 1 reduces a loss associated with scattering or absorption of light by a foreign substance from the outside, so that a coupling loss can be reduced.

Since the refractive index of the refractive-index matching agent 30 approximates the refractive index of each of the cores 121 and the refractive index of the optical connector 20, the optical connector module 1 can reduce the Fresnel reflection at each boundary surface. The optical connector module 1 can improve a coupling efficiency by causing light to be emitted from the cores 121 with a high transmittance. The optical connector module 1 can improve a coupling efficiency by causing light to be emitted from the optical connector 20 with a high transmittance.

The optical transmission line 10 and the optical connector 20 are fixed to each other with the refractive-index matching agent 30, so that the optical connector module 1 can reduce optical axis displacement due to long-term use, its deterioration over time, or the like. Thus, the optical connector modules 1 can maintain the same optical property for a long period of time in a state where the relative positions of the optical transmission line 10 and the optical connector 20 have been determined by initial positioning. In the manner described above, the optical connector module 1 can have an improved product quality.

Similar to the refractive-index matching agent 30, the optical connector 20 is also made of a material having a refractive index that approximates the refractive index of each of the cores 121, so that the optical connector module 1 can reduce the Fresnel reflection and reduce a coupling loss.

It is obvious to those skilled in the art that the present disclosure can be embodied in other specific forms other than the above-described embodiment without departing from the spirit or the essential characteristics thereof. Thus, the above description is an example, and the present disclosure is not limited to the above description. The scope of the present disclosure is defined not by the above description but by the claims. Among all possible changes, some changes that are within a range equivalent to the scope of the present disclosure are within the scope of the present disclosure.

For example, the shapes, the arrangements, the orientations, and the numbers of the above-described components are not limited to those described above or those illustrated in the drawings. The shapes, the arrangements, the orientations, and the numbers of the components may be arbitrarily set as long as the functions of the components can be obtained.

For example, the parameter values relating to the optical transmission line 10, the optical connector 20, and the refractive-index matching agent 30 are not limited to the above-mentioned values. Each parameter may include any value as long as the optical connector module 1 can obtain a desired highly-accurate optical property.

In the above-described embodiment, although the core size of each of the cores 121 of the optical transmission line 10 is within a range of, for example, 5 μm or larger and 15 μm or smaller, the present disclosure is not limited to this case. For example, the core size of each of the cores 121 may be 0.2 μm. For example, the refractive index of each of the cores 121 of the optical transmission line 10 may be within a range of 3.0 or more and 4.0 or less. Similarly, the refractive index of the refractive-index matching agent 30 may be, for example, within a range of 3.0 or more and 4.0 or less. Similarly, the refractive index of the optical connector 20 may be, for example, within a range of 3.0 or more and 4.0 or less.

In the above-described embodiment, although the difference between the refractive index n1 and the refractive index n2 is equal to or less than 15% of the refractive index n2, the present disclosure is not limited to this case. For example, the difference between the refractive index n1 and the refractive index n2 may be equal to or less than 20% of the refractive index n2 or may be equal to or less than 25% of the refractive index n2.

In the above-described embodiment, although the single first lens 225 is provided, the present disclosure is not limited to this configuration. Two or more first lenses 225 may be provided as long as the number of the first lenses 225 is smaller than the number of the second lenses 226.

Figure 11:
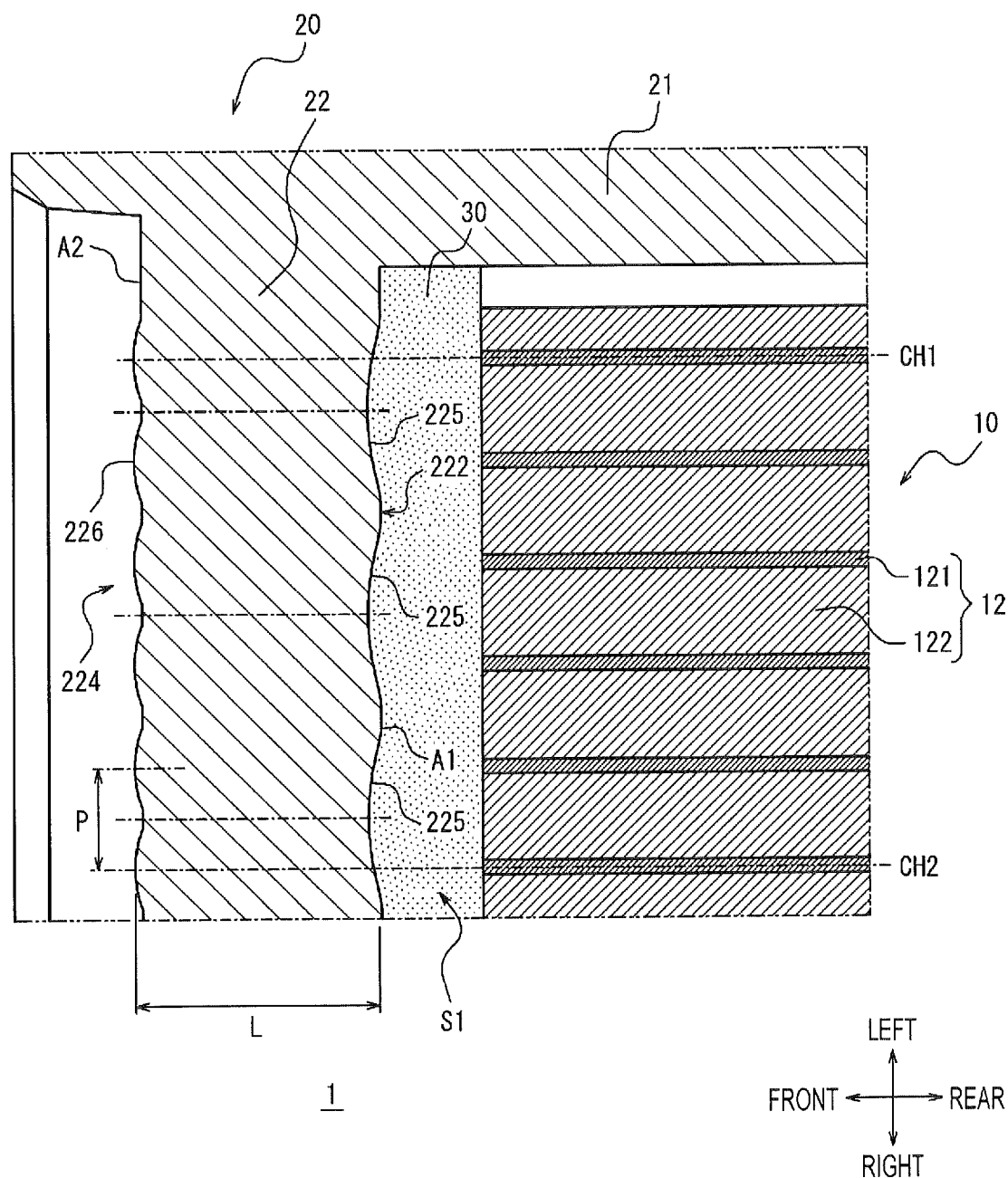
FIG. 11 is an enlarged cross-sectional view corresponding to FIG. 8 and illustrating a variation of the optical connector module.

FIG. 11 is an enlarged cross-sectional view corresponding to FIG. 8 and illustrating a variation of the optical connector module 1. For example, as illustrated in FIG. 11, the six first lenses 225 may be provided while the twelve second lenses 226 are provided in total. In this case, for example, in the first direction perpendicular to the light propagation direction, the center of the single first lens 225 through which the optical axis passes may coincide with the centers of two of the second lenses 226, the two second lenses 226 corresponding to the single first lens 225. In addition, the single first lens 225 is fainted so as to overlap the two second lenses 226, which correspond to the single first lens 225, in the first direction perpendicular to the light propagation direction.

In the above-described embodiment, although the multiple second lenses 226 are arranged in a row in the first direction perpendicular to the light propagation direction, the present disclosure is not limited to this configuration. Multiple rows of the second lenses 226 along the first direction perpendicular to the light propagation direction may be formed in the vertical direction. In this case, the single first lens 225 or a row of the first lenses 225 may be formed with respect to the multiple rows of the second lenses 226, or multiple rows of the first lenses 225 may be formed in the vertical direction so as to correspond to the multiple rows of the second lenses 226.

In the above-described embodiment, although the multiple second lenses 226 are formed so as to be equally spaced in the transverse direction, the present disclosure is not limited to this configuration. The multiple second lenses 226 may be non-equally spaced in the transverse direction. In this case, the multiple transmission channels of the optical transmission line 10 may also be non-equally spaced in the transverse direction.

In the above-described embodiment, although the first lens 225 is formed so as to overlap all the multiple second lenses 226 in the first direction perpendicular to the light propagation direction, the present disclosure is not limited to this configuration. For example, the first lens 225 may be formed so as to overlap some of the multiple second lenses 226 in the first direction perpendicular to the light propagation direction.

In the above-described embodiment, although the center P1 of the first lens 225 and the center P2 of the aggregate of the second lenses 226 coincide with each other in the first direction perpendicular to the light propagation direction, the present disclosure is not limited to this configuration. For example, the center P1 of the first lens 225 and the center P2 of the aggregate of the second lenses 226 do not need to coincide with each other in the transverse direction.

In the above-described embodiment, although the center P1 of the first lens 225 and the center P2 of the aggregate of the second lenses 226 coincide with each other in the second direction, which is perpendicular to the light propagation direction and to the first direction, the present disclosure is not limited to this configuration. For example, the center P1 of the first lens 225 and the center P2 of the aggregate of the second lenses 226 do not need to coincide with each other in the vertical direction.

In the above-described embodiment, although the radius of curvature of the first lens 225 is larger than the radius of curvature of each of the second lenses 226, the present disclosure is not limited to this configuration. For example, the radius of curvature of the first lens 225 may be the same as the radius of curvature of each of the second lenses 226.

In the above-described embodiment, although the first lens 225 is formed as a concave lens, the present disclosure is not limited to this configuration. The first lens 225 may be any type of lens such as a convex lens as long as a desired highly-accurate optical property can be obtained.

In the above-described embodiment, although each of the second lenses 226 is formed as a convex lens, the present disclosure is not limited to this configuration. Each of the second lenses 226 may be any type of lens such as a concave lens as long as a desired highly-accurate optical property can be obtained.

In the above-described embodiment, although the first lens 225 and the second lenses 226 each have an arc shape in cross section, the present disclosure is not limited to this configuration. The first lens 225 and the second lenses 226 may each have a spherical surface or may be an aspherical surface.

In the above-described embodiment, although the optical waveguide 12 is formed on the top surface of the base body 11, the present disclosure is not limited to this configuration. For example, the optical waveguide 12 may be embedded in the base body 11. In this case, the end surface of the optical waveguide 12 may be flush with the end surface of the base body 11, and the end surfaces of the cores 121 may be exposed at the base body 11.

In the above-described embodiment, although only the first space S1 is filled with the refractive-index matching agent 30, the present disclosure is not limited to this configuration. For example, the refractive-index matching agent 30 may be injected so as to fill the recess 212 of the optical connector 20, the recess 212 covering the optical transmission line 10, in addition to the first space S1.

In the above-described embodiment, although the refractive-index matching agent 30 is interposed between the end surface of the optical waveguide 12 and the first lens 225, the present disclosure is not limited to this configuration. The refractive-index matching agent 30 may be provided in any space between the end surface of the optical transmission line 10 and the first side surface A1 excluding the space between the end surface of the optical waveguide 12 and the first lens 225. Even in such a case, the refractive-index matching agent 30 also serves to reduce entry of a foreign substance. As a result, the optical connector module 1 reduces a loss associated with scattering or absorption of light by a foreign substance from the outside as mentioned above, so that the coupling loss can be reduced.

In the above-described embodiment, although the optical connector module 1 includes the optical transmission line 10 including the base body 11 and the optical waveguide 12 stacked on the base body 11, the present disclosure is not limited to this configuration. The optical connector module 1 does not need to include the optical transmission line 10 and may include only the optical connector 20 and the refractive-index matching agent 30.

REFERENCE SIGNS 1 optical connector module
10 optical transmission line
11 base body
12 optical waveguide
121 core
122 cladding
122a first cladding
122b second cladding
20 optical connector
21 first base
211 bottom surface
212 recess
213 contact portion
213a contact surface
214 first bonding portion
214a bonding surface
215 side wall
216 relief concave portion
217 positioning portion
22 second base
221 through hole
222 first cutout portion
223 second bonding portion
224 second cutout portion
225 first lens
226 second lens
30 refractive-index matching agent
A agent
A1 first side surface
A2 second side surface
C corner
CH1 end channel
CH2 center channel
F fillet
L surface-to-surface distance
P channel-to-channel pitch
P1 center
P2 center
S1 first space
S2 second space
n1 refractive index
n2 refractive index
φ beam diameter

The invention claimed is:

1. An optical connector attached to an optical transmission line including a base body and an optical waveguide stacked on the base body, the optical connector comprising:
a first side surface facing an end surface of the optical transmission line;
a second side surface located opposite to the first side surface in a light propagation direction;
at least one first lens formed in the first side surface to face an end surface of the optical waveguide; and
multiple second lenses formed at positions on the second side surface, the positions facing the first lens in the light propagation direction,
wherein a total number of lenses of the at least one first lens is less than a total number of lenses of the multiple second lenses, and wherein a lens surface of one of the at least one first lens is formed so as to extend over at least two adjacent ones of the multiple second lenses and a shape of the lens surface of the first lens varies depending on positions at which the multiple second lenses are formed.

2. The optical connector according to claim 1, wherein the at least one first lens consists of a single first lens.

3. The optical connector according to claim 2, wherein the multiple second lenses are arranged in a row in a first direction perpendicular to the light propagation direction.

4. The optical connector according to claim 2, wherein the single first lens overlaps all lenses of the multiple second lenses in a first direction perpendicular to the light propagation direction.

5. The optical connector according to claim 4, wherein the single first lens is a concave lens.

6. The optical connector according to claim 4, wherein each second lens of the multiple second lenses is a convex lens.

7. The optical connector according to claim 2, wherein, in a first direction that is perpendicular to the light propagation direction and a second direction that is perpendicular to the light propagation direction and to the first direction, a center of the single first lens through which an optical axis passes coincides with a center of the multiple second lenses when the multiple second lenses are seen as a whole.

8. The optical connector according to claim 7, wherein a radius of curvature of the single first lens is larger than a radius of curvature of each second lens of the multiple second lenses.

9. The optical connector according to claim 7, wherein the single first lens is a concave lens.

10. The optical connector according to claim 7, wherein each second lens of the multiple second lenses is a convex lens.

11. The optical connector according to claim 1, wherein a radius of curvature of the at least one first lens is larger than a radius of curvature of each second lens of the multiple second lenses.

12. The optical connector according to claim 11, wherein the at least one first lens is a concave lens.

13. The optical connector according to claim 11, wherein each second lens of the multiple second lenses is a convex lens.

14. The optical connector according to claim 1, wherein the at least one first lens is a concave lens.

15. The optical connector according to claim 1, wherein each second lens of the multiple second lenses is a convex lens.

16. The optical connector according to claim 1, further comprising:
a first base placed on the optical transmission line; and
a second base projecting from the first base in a direction perpendicular to another direction in which the first base extends, and the second base facing the end surface of the optical transmission line,
wherein the second base comprises the first side surface and the second side surface.

17. The optical connector according to claim 1,
wherein the optical connector is a resin material.

18. An optical connector module comprising:
the optical connector according to claim 1;
the optical transmission line including the base body and the optical waveguide stacked on the base body; and
a refractive-index matching agent interposed between the end surface of the optical transmission line and the first side surface and configured to adjust a refractive index.

19. The optical connector module according to claim 18, wherein the refractive-index matching agent is interposed between the end surface of the optical waveguide and the at least one first lens.

* * * * *